Nov. 27, 1945.  F. H. HAGNER  2,389,851
MISSILE DISPENSING DEVICE
Filed June 9, 1942  3 Sheets-Sheet 2
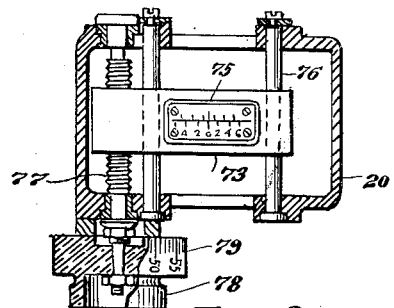
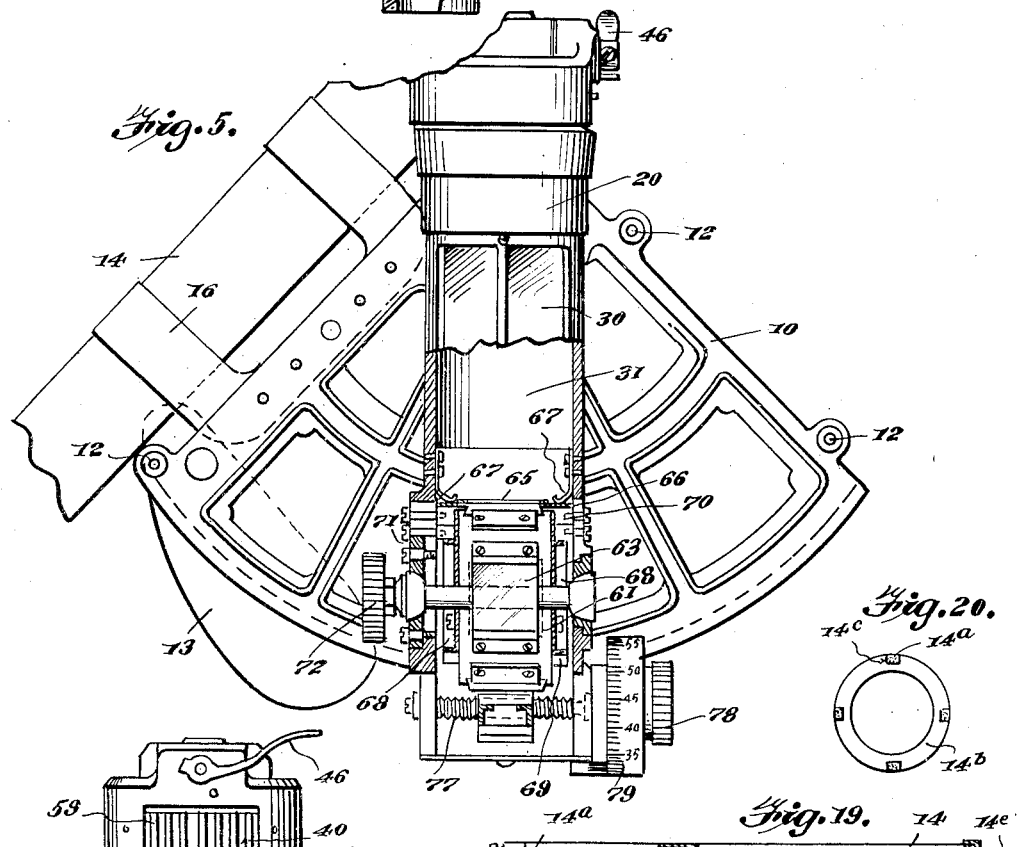
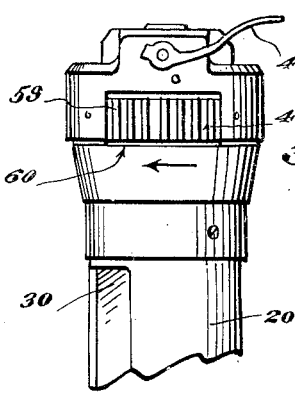
Inventor
FREDERICK H. HAGNER Nov. 27, 1945. F. H. HAGNER 2,389,851
MISSILE DISPENSING DEVICE
Filed June 9, 1942 3 Sheets-Sheet 3
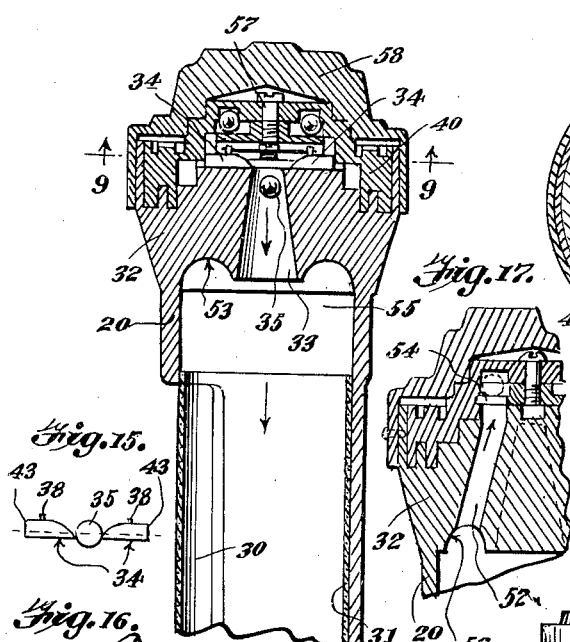
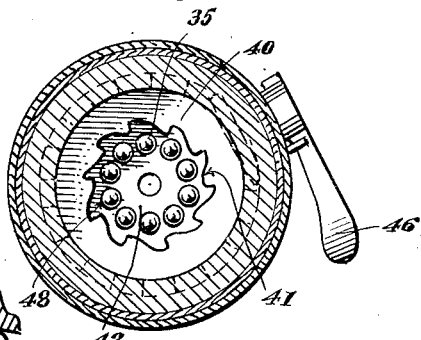
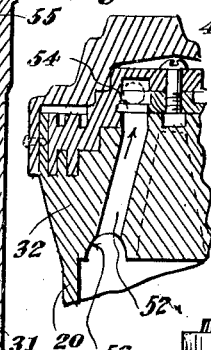
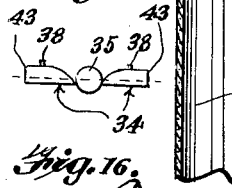
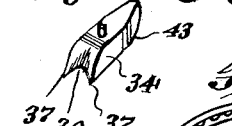
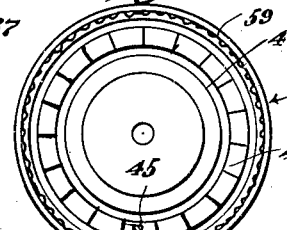
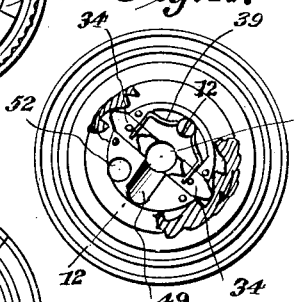
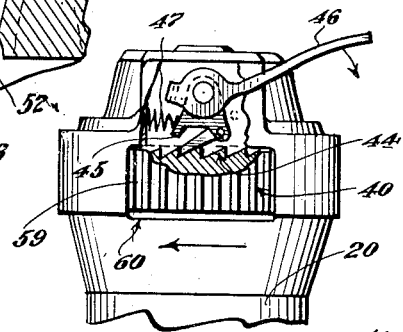
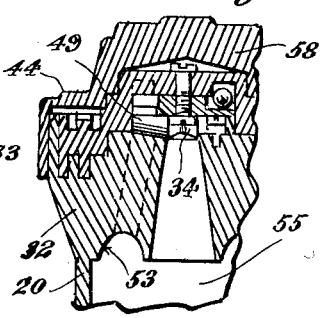
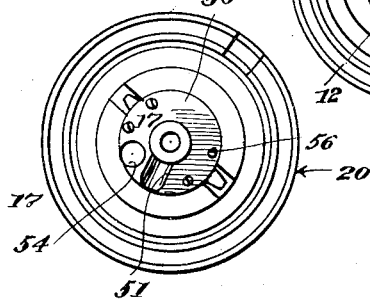
Inventor
FREDERICK H. HAGNER
By
Attorney Patented Nov. 27, 1945

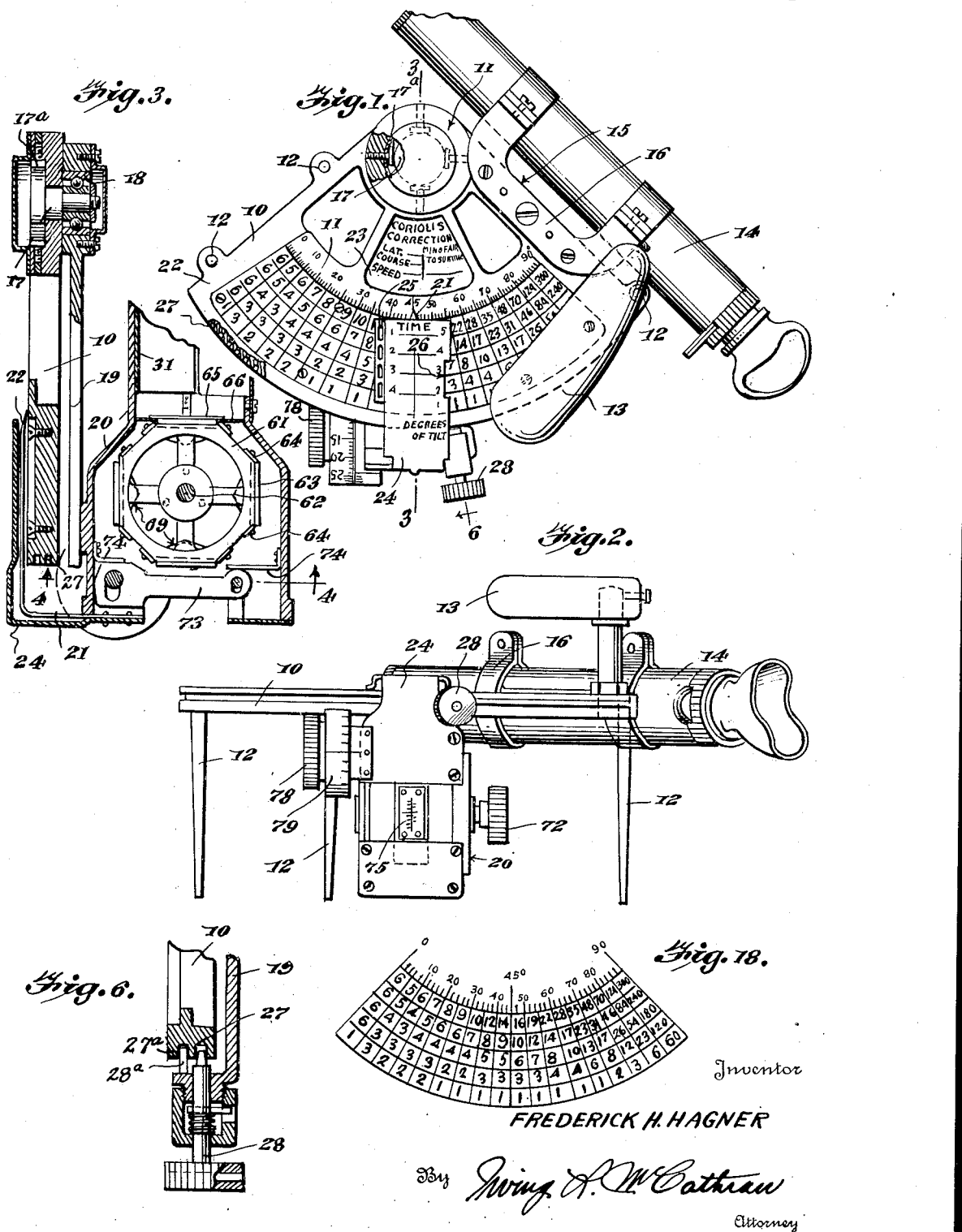

2,389,851

UNITED STATES PATENT OFFICE 2,389,851

MISSILE DISPENSING DEVICE

Frederick H. Hagner, San Antonio, Tex., assignor to Archbold-Hagner Instrument Laboratory, Inc., a corporation of Delaware Application June 9, 1942, Serial No. 446,389

6 Claims. (Cl. 206—56)

This invention relates to an artificial horizon recording and averaging sextant, and has for one of its objects the production of a simple and efficient instrument in the nature of a sextant, the arc of which is 90°, and the parts of the instrument are constructed and arranged so as to efficiently measure and record the angles of an observed object relative to the position in which the sextant is held, and also measure and record the degree of tilt at which the instrument is held.

A further object of this invention is the production of a simple and efficient missile-dropping means for use in an instrument for measuring the angle as well as the degree of tilt of the instrument.

Another object of this invention is the production of a simple and efficient recording means for use with a missile-dropping device for recording the angle and degree of tilt of an instrument upon which it is used.

Other objects and advantages of the present invention will appear throughout the following specification and claims.

In the drawings:

Figure 1 is a side elevational view of the sextant;

Figure 2 is an edge elevational view;

Figure 3 is a fragmentary vertical sectional view taken on line 3—3 of Figure 1;

Figure 4 is a horizontal sectional view taken on line 4—4 of Figure 3;

Figure 5 is a fragmentary side elevational view of the instrument looking at the opposite side to that shown in Figure 1, and showing a portion of the missile-dropping tube in vertical section;

Figure 6 is a vertical sectional view taken on line 6—6 of Figure 1;

Figure 7 is a side elevational view of the upper end of the missile-dropping tube looking at right angles to the position shown in Figure 5;

Figure 8 is a vertical sectional view through the upper end of the missile-dropping tube;

Figure 9 is a horizontal sectional view taken on line 9—9 of Figure 8;

Figure 10 is a top plan view of the missile-dropping tube with the cap removed, and illustrating the ball-dropping mechanism, certain parts being shown in section;

Figure 11 is a top plan view of the missile-dropping tube, showing the cover plate in position over the missile-dropping shuttles;

Figure 12 is an enlarged fragmentary sectional view taken on line 12—12 of Figure 10;

Figure 13 is a top plan view of the tube illustrating the top end of the ratchet disc which controls the missile-feeding and dropping mechanism, the top cap of the tube being removed;

Figure 14 is a fragmentary side elevational view of the upper end of the missile-dropping tube, certain parts being broken away to illustrate the pawl and ratchet mechanism which rotates the missile-feeding and dropping mechanism;

Figure 15 is a diagrammatic view of the ball-supporting shuttles illustrating the ball in a supported position;

Figure 16 is a perspective view of one of the ball-supporting shuttles;

Figure 17 is a vertical sectional view taken on line 17—17 of Figure 11, showing also the cap and ratchet wheel and ball-magazine and also the cap in position;

Figure 18 is a diagrammatic view of the computed chart also shown in Figure 1;

Figure 19 is a side elevational view of the sighting tube, certain parts being broken away; and Figure 20 is a plan view of the luminous dot-carrying ring.

By referring to the drawings, it will be seen that 10 designates the segmental frame which is suitably marked to indicate a 90° arc in the nature of a scale 11. The frame 10 is provided with lateral legs 12 which are adapted to support the instrument when not in use and when in a position shown in Figure 2. A suitable handle 13 extends from the opposite side of the frame 10 relative to the legs 11 to facilitate the holding of the instrument in an operative position while making an observation of a selected object. An observation or sighting tube 14 is secured to the upper inclined side 15 of the frame 10 by means of a suitable clamp 16. The frame 10 carries a journal 17 at its upper end of a type described in the following, and this journal 17 engages a ball-bearing structure 18 which is journaled in the upper end of the hanger 19. This hanger 19 is suspended from the journal 17 in a pendulum-like manner and is adapted to freely swing relative to the frame 10. The journal 17 is adjustably held in a set position by means of the clamping shoes 17ᵃ carried by the frame 10, so that the journal 17 may be properly centered.

A missile or ball-dropping tube or casing 20 is fixed to the lower end of the hanger 19 and extends vertically thereof and parallel therewith. An indicator hand 21 is secured to the lower end of the casing 20 and extends vertically of and in overlying relation relative to the arc-shaped chart plate 22 which is carried by the outer face of the frame 10 just below the 90° scale 11. This chart plate 22 is provided with suitable calculations which will be hereinafter described. Directly above the center of the chart plate 22 or in any other convenient position is placed a memorandum plate 23 to receive notations of "Coroiles correction" with spaces for notations of "Latitude," "Course," "Speed," "Minutes of arc to subtract" and such other notations which may be desired.

A gauge plate 24 which is preferably transparent is carried by the lower end of the casing 20 and extends upwardly and in overlying relation relative to the chart plate 22. This plate 22 is provided with a series of (preferably four) vertically aligned apertures 25 to permit an operator to mark with a pencil or other means upon the chart plate 22 the positin of the plate 22 at four different readings for later calculation and consideration. These apertures 25 are marked 1, 2, 3 and 4, as shown in Figure 1. The plate 22 is provided with a notch 26 upon the edge thereof opposite the apertures 25 for registration with notations appearing on the plate 22, as described in the following. The side edge of the gauge plate 24 is provided with graduations marked 1, 2, 3, 4, 5 for registration with the five arcs formed on the chart plate 22, shown in Figure 1. The frame 10 is provided with a series of sockets 27 formed in the lower edge thereof, which notches 27 are placed two degrees apart. A spring-pressed plunger 28 is carried by the hanger 19 and is adapted to selectively register with the sockets 27 to lock the hanger 19 and casing 20 in a set swung position when the observation or sighting tube 14 is on the target or in a proper observing position to record the angle of an observed object relative to the position of the instrument. The type of observation or sighting tube used with the present invention is illustrated in detail in Figure 19. The tube 14 is provided with a sighting opening 14ᵃ and a ring 14ᵇ is threaded into the tube 14, as shown in Figure 19 to a point shown in Figure 19 where the ring is properly positioned. This ring 14ᵇ is preferably made of Lucite or other transparent material having four notches 14ᶜ formed in the periphery, which notches are filled with luminous material 14ᵈ. The outer end of the sighting tube is provided with a center luminous dot 14ᵉ formed on the Lucite disc 15ᵃ.

The arc frame 10 is provided with a longitudinally extending channel 27ᵃ which parallels the notches 27, and a lug 28ᵃ which is carried by the hanger 19 fits into this channel 27ᵃ to steady one part relative to the other.

The observer sights the tube on the object in a position so that his eye may view all four luminous spots formed upon the ring 14ᵃ. He then knows that his eye is centered so that there is no parallax error when he is observing a distant object. These luminous spots provide visible indicating means which are visible at night-time although during the day-time they would be unnecessary.

The missile or ball-dropping tube 20 constitutes an angle-recording device and embodies a ball-dropping unit carried in the top of the tube, and a recording unit or means carried at the bottom of the tube. The tube 20 is provided with windows 30 upon one side thereof, and an inner light-reflecting lining 31 opposite the windows 30, as illustrated in Figure 8. The tube 20, as shown, is carried by the hanger member 19 and is adapted to freely swing in a pendulum-like manner with the hanger 19 upon the ball-bearing 18 while the frame 10 is held in a stationary position. The indicator hand 21 is carried by the bottom of the tube 20, and is adapted to travel over the face of the chart plate 22 to indicate the position of the tube 20 relative to the chart plate 22 and relative to the 90° arc 11 carried by the outer face of the body 10. The gauge plate 24 is also carried by the bottom of the tube 20 and overlies the outer face of the body 10, as well as the indicator hand 21. The upper end of the hand 21 projects slightly above the gauge plate 24, as shown in Figures 1 and 3.

By referring particularly to Figures 8 to 16 inclusive, it will be noted that the ball or missile-dropping unit is illustrated wherein the tube 20 is provided with an enlarged upper end 32 having a downwardly extending flared ball-discharge opening 33 for dropping a ball into the interior of the tube 20. A pair of oppositely disposed ball-engaging shuttles 34 are slidably mounted upon opposite sides of the inner end of the ball-discharge opening 33, and these shuttles 34 are adapted to support a ball 35 in the upper end of the opening 33 in the manner shown in the diagram in Figure 15. Each shuttle 34 comprises a body having a notched inner end 36 defining points 37 which are adapted to contact the ball 35 just below its line of equator or central axis, as indicated in Figure 15, so that the ball 35 may be properly supported in the upper end of the opening 33. Each shuttle 34 is provided with an upwardly extending pin 38, and these pins 38 are engaged by an expansion spring 39 for normally spreading the shuttles 34 apart to cause the ball 35 to drop when the shuttles 34 are moved apart by means of the spring 39.

A revolvable ratchet disc 40 is rotatably mounted in the upper end of the casing 20 and overlies the shuttles 34. This ratchet disc 40 is provided with ratchet teeth 41 formed upon the inner periphery of the socket 42 in the under face of the ratchet disc 40. Each shuttle 34 is provided with a tapering outer end 43 and these tapering ends 43 of the opposite shuttles are adapted to register with opposite ratchet teeth 41 in a manner to cause the shuttles 34 to alternately move toward each other and retract from each other so as to alternately support and drop one of the balls 35 through the opening 33. The ratchet disc 40 is also provided with ratchet teeth 44 which are formed upon the upper face of the ratchet disc 40 and are adapted to be engaged by a pivoted pawl 45 carried by the operating trigger 46. A spring 47 is secured to the trigger 46 to return the trigger to its original position when released. By pressing the trigger 46 downwardly the pawl 45 engages one of the teeth 44 and rotates the disc 40 a distance of one tooth and when the trigger 46 is released the spring 47 returns the trigger to its normal position and the pawl 45 engages the next succeeding tooth 44.

The socket 42 is provided in its under face with ten ball-receiving pockets 48 in the under face thereof, for receiving the balls 45, nine balls being placed within the pockets and one pocket being empty for the reason described in the following. The pockets 48 correspond with the number of ratchet points or teeth 41 so as to feed a ball 35 to the upper end of the opening 33, as soon as the shuttles 34 are moved to a ball-engaging position shown in Figure 15, and after the previously supported ball has been dropped. The device is also timed as to cause the shuttles 34 to drop into the cavity of the ratchets 41 thereby releasing the ball 35 held by the shuttles and then the shuttles 34 move to a ball-engaging position and another ball is dropped into engaging position with the shuttles 34. In this manner the balls are alternately supported and released and alternately fed to the shuttles after one ball has been released. The upper end 32 of the tube 20 is provided with an inwardly extending and downwardly inclined channel 49 which is adapted to register with one of the ball-receiving pockets 48 as the ratchet disc 40 is rotated to bring one of the balls 45 into registration with the channel 49 for feeding a ball toward the opening 33. A cap plate 50 fits over the shuttles 34 to shield the spring 39 and the shuttles, and this cap plate 50 is provided with a registering notch 51 which registers with the channel 49 and to permit the balls to drop from the pockets 48 into the channel 49 and then to pass into the upper end of the ball-discharge opening 33 where the ball is engaged by the shuttles 34 until released.

The enlarged end 32 of the tube 20 is provided with a filling passage 52 which communicates with a channel 53 formed in the upper end of the central compartment 55 of the tube 20. This filling passage 52 communicates with a filling aperture 54 formed in the plate 50, and this aperture 54 is adapted to register with the ball-receiving pockets 58 as the ratchet disc 40 is rotated for the purpose of filling the pockets 48 with the balls 35. This is accomplished by merely inverting the tube 20 thereby permitting balls which have fallen into the compartment 55 to drop into the channel 53 and pass into the filling passage 52 through the aperture 54 and thence into one of the pockets 48. The ratchet disc 40 is then rotated the distance of one tooth to bring the next succeeding pocket into registration with the aperture 54 and another ball is dropped into this next succeeding pocket 48 and so on until all of the pockets are filled with the exception of one which is in final registration with the aperture 54. The plate 50 will therefore retain the balls within the remaining pockets 48 with the exception of that pocket which is moved over the channel 49 and the ball in this last mentioned pocket will then roll down through the channel 49 into the upper end of the opening 33 where the ball will be supported by the inner pointed ends of the shuttles 34 in a manner shown in Figure 15. By holding the instrument in a proper position and obtaining a proper sight through the sighting tube 14, then pressing the trigger 46 downwardly, the ratchet disc 40 will be rotated for a distance of one tooth, causing the receding portions at diametrically opposite points of the ratchet 41 to permit the spring 39 to spread the shuttles 34 apart, thereby releasing the ball 35 and causing the ball 35 to fall through space by force of gravity and by impact upon a suitable recording means described in the following, record the angle of incline as well as the angle of tilt at which the instrument is being held relative to the object observed. When the trigger 46 is released, the pawl 45 will engage the next succeeding tooth 44 on the ratchet disc 40 and the parts will be in a position to again operate. As the trigger 46 is pressed downwardly and as the disc 40 rotates, one of the balls is fed into engaging position with the shuttles 34 and the shuttles 34 are simultaneously moved to a ball-supporting position. The spring 39 is of sufficient strength to release the ball 35 held by the shuttles 34 at greater speed than that caused by the pull of gravity, thereby causing the ball 35 to be momentarily held in suspended unsupported relation just before the ball begins to drop.

The plate 50 is held in position by suitable screws 56, and the ratchet disc 40 is journaled upon an anchoring pin 57 which engages the center of the plate 50. A suitable protector cap 58 fits over the upper enlarged end 32 of the tube 20 to shield the ball-dropping mechanism at the upper end of the tube or casing 20. The ratchet disc 40 is preferably provided with a ribbed periphery 59 and the tube 20, as well as the cap 58 is preferably notched, as at 60, to facilitate the manual operation of the disc if desired, and an arrow is preferably placed upon the enlarged upper end 32 adjacent this notched portion 60 to indicate the direction of rotation of the disc 40. The notch 60 will permit the operator to manually rotate the disc 40 with his finger while loading.

A recording device is located in the lower end of the tube 20, and this recording device comprises an octagonal frame 61 which is mounted on a transversely extending horizontal shaft 62. This octagonal frame 61 is provided with recording plates 63 anchored in position by retaining plates 64. A stamping element 65 in the nature of an inked ribbon or other means, is mounted just above the frame 61 and is in the nature of an inked ribbon or carbon sheet so as to cause an impression or indicating mark to be stamped upon the adjoining plate 63 of the frame 61 at the impact of a ball 35 which is dropped from the ball-dropping mechanism mounted in the upper end of the tube 20. This stamping element 65 is carried by a suitable supporting plate 66, which plate 66 is engaged by springs 67 secured to the sides of the tube or casing 20 to normally force the stamping element 65 into contact with an adjoining plate 63 of the frame 61. The frame 61 carries cam wheels 68 upon opposite sides thereof, which cam wheels 68 are provided with notches 69 adjacent each plate 63 to receive the sliding shoes 70 carried by the plate 66, thereby permitting the stamping element 65 to contact with the adjoining plate 63. The frame 61 is carried by a shaft 71, which shaft carries a knurled nut 72 at its outer end to facilitate the rotation of the frame 61 to selectively bring one of the plates 63 into registration with the stamping element 65. As the frame 61 is rotated, the stamping element will be raised due to the fact that the shoes 70 will ride out of the notches 69 and follow the periphery of the cam wheels 68, thereby permitting the frame 61 to freely rotate and prevent the stamping element 65 from smearing the faces of the plates 63 as the frame 61 is rotated. By means of this structure four separate and distinct readings may be obtained by successively bringing the plates 63 into registration with the stamping element 65, dropping the balls to obtain the reading, and then moving the next succeeding plate into position.

A measuring element 73 is mounted just below the frame 61, as shown in Figures 3 and 5, and this measuring element 73 is inwardly movable against the springs 74 to move the measuring element into close proximity with the adjoining plate 63 while reading. This measuring element 73 is provided with a graduated transparent plate 75 which will be described more fully in the following. The measuring element 73 is supported upon transverse shafts 76 and is moved transversely of the casing 20 by means of a transversely extending threaded shaft 77 which is operated by a knurled nut 78 and is provided with a vernier disc 79.

The chart 22 is preferably divided into five superimposed arcs and each arc is divided into eighteen radiating spaces defining boxes, the boxes being numbered to represent the refraction and tilt correction for the particular angle of tilt recorded by the missile for the given altitude of the object observed, which last mentioned angle is indicated by the pointer 21 on scale 11. The chart 22 is illustrated in detail in Figure 18 and is accurately computed to provide an immediate and ready reference to ascertain the correct altitude of the body observed and eliminate error of calculation. The mathematical calculations shown on the chart 22 give the observer by inspection the necessary correction for determining the correct altitude of the object observed.

It is understood that by means of this device, a permanent record coordinate is made at each observation, and that the ball impact point on the recording device records pertinent conditions of the instrument at the time of observation. The angle of tilt of the sextant at the time of observation is recorded, and the correct altitude is obtained by use of a correction table, such as the chart 22. During observation, the vertical line to the earth's center is used instead of a horizontal line for the fundamental line of reference, as has heretofore been the practice, and the observer's attention is upon one objective at a time.

An acceleration of the sextant during the 0.14 second of time taken for the ball to fall may be the only acceleration error in the observed altitude, and it should be noted that there is no bubble to lag and set up conditions which would affect the readings as is common where bubbles are used in instruments of this character. The sights in the sighting tube 14 are fixed so as to eliminate all corrections for semi-diameters of the sun and moon. The sight tube's center line is placed upon the center of the body observed and the observer can therefore be aware of any appreciable error before reading the pattern made by the falling balls. Since the observer sights directly at the celestial body, he thereby avoids any chance of observing the wrong star.

By means of the present invention, the observational fatigue of the observe is reduced, since all motions and attentions of the observer are directed toward one objective, that is, the body observed, and it has been found that the present instrument may be operated faster than other artificial horizon sextants. The scale arc 11 subtends a true 90° arc which reduces mechanical eccentricity errors, and since the sighting tube 14 has no optics, rapid production of the instruments will be facilitated. No mirrors, requiring delicate care and adjustment, are used, and no batteries are employed which would be likely to deteriorate. The instrument is therefore a twenty-four hour observing instrument. It has been found by experimenting with this instrument that index error can be checked more readily than with any other known artificial horizon sextant; and that the skill of the observer with this instrument is comparable to his skill with a portable firearm as he actually "shoots" the celestial body by direct observation. For ranging purposes, the instrument can be used to measure angles from 90° above the horizon to 90° below, by reversing the position of the tube 14. For observation above 20,000 feet, where the dust of the atmosphere is slight, the very bright stars may be used in the day time, as the sighting is direct.

To assist in understanding the purpose and uses of the present averaging sextant, the following information may be of assistance:

The latitude of an observer is a definite function of the altitude, or zenith distance, of a celestial body of known declination and hour angle. The altitude of the body is defined to be the angle, in the plane of the vertical circle, between the line of sight and the horizontal.

In the determination of the altitude of a celestial body, the navigator must make his observations with an instrument which is not rigidly fixed either in a vertical circle or relative to the horizontal plane. Small errors, therefore, are present in all of his observational data. The desideratum of all navigators is an instrument with which the angles of apparent positions of the celestial bodies can be quickly and conveniently obtained and in which the residual errors are reduced to a minimum.

The errors to which the navigator's observations are liable may be classified as follows:

I. Errors of instrument construction
    (a) Construction of the pivot
    (b) Graduation of the scale
    (c) Alignment of the line of sight
        1. Relative to the plane of the scale arc
        2. Relative to the zero reading
    (d) Number of critically adjustable parts in the instrument
    (e) Method of determining a horizontal or vertical reference line II. Errors in the observer's estimation of:
    (a) The sighting of the observed body
    (b) Orientation in regard to the reference lines
    (c) The reading of the instrument's scales III. Errors from external sources:
    (a) Velocity of the instrument and accelerations to which it is subjected during the time of observation
    (b) Variability of atmospheric refraction:
        1. With changing gradients of temperature and pressure, either natural or artificial
        2. With changing elevation of the observer
    (c) Visibility, magnitude, the identification of the observed body and the reference line.

The present averaging sextant was developed with the aim of reducing the residual errors due to some of these general causes.

*I. Error of instrument construction*

The basic principle of this averaging sextant is the use of the vertical, as determined by the line of fall of a steel sphere, as the fundamental reference line. The use of this principle is practical and simple, permitting sturdy construction in all parts of the instrument. The errors whose sources are in the construction of the instrument are, therefore, in theory, less than those of any sextant in use today.

For comparable pivot and arc constructions, effects of errors in this present averaging sextant are reduced by half; because one degree of measured altitude is represented on the scale by one full degree of arc, as opposed to the two-to-one reduced scale of the ordinary mirror sextant. This advantage is gained through elimination of the system of mirrors or prisms and by direct measurement of the angle between the vertical reference line and the line of sight, giving the zenith distance or the complement of the altitude.

With the use of a tangent screw, there is need for graduation of the scale in integral degrees only. The minutes are read from a micrometer drum and tenths of minutes from a micrometer drum vernier. This system provides a least count of 6″, as compared with a usual least count of (a) 10″ provided by the high grade sextant, (b) 30″ provided by the endless tangent screw micrometer drum sextant, and (c) 1′ or more provided by the bubble, or liquid pendulum sextant. The use of the full scale reduces the effective backlash and permits a more rugged construction of the tangent screw mechanism.

The alignment of the line of sight in the present averaging sextant is as important as the same alignment in other sextants. The sighting tube, however, is securely fastened to the limb or side of the sextant and is more trustworthy, when once adjusted, than are optical parts mounted vulnerably on the limb and index bar. The elimination of the optical measuring system reduces the number of critically adjustable parts in the instrument.

The present averaging sextant provides a method of completely recording the reference line from which the altitude of the celestial body is measured. This reference line is the effective vertical at the time of releasing the ball, and the effective vertical is the line determined by the effective accelerations acting upon the ball. For this reason, two or more balls must be dropped to assure the operator that the accelerations are those expected. If the observer has a steady hand and is a good marksman with some light firearm, then he can make a single point pattern with the several released balls. He may then be sure that his reference line is as reliable as, if not more reliable than, the line of sight to a varying and often indistinct horizon, or the vertical through a lagging bubble.

Being simple in idea, the construction of the present averaging sextant is more sturdy than that of other sextants, thus affording equal if not superior measuring possibilities as compared to any present instrument of equal size and equivalent precision of construction.

II. Errors in the estimations of the observer

The errors occurring as a result of estimations by an observer are likewise brought to a minimum, for an instrument of this size and type, since the present averaging sextant is unique in requiring the observer's attention to be concentrated on but one operation at a time. The observer is not required to jiggle and watch a liquid pendulum, or to consider the problem of tengency with a variable or ill-defined horizon. He merely centers the object in the line of sight and releases the balls. He then reads the mean point of impact in each of two coordinates, one on the scale for altitude, the other on the reticle for tilt.

A rotation of the instrument about the line of sight results in a departure from the correct vertical circle. This rotation is recorded on the target as a tilt. By means of the altitude and tilt readings, correction values are obtainable from tables supplied with the instrument. The tilt correction is applied subtractively to the altitude reading to obtain the apparent altitude of the body. The present averaging sextant is unique, at this time, in correcting for this error, which is common to all sextants.

III. Errors from external sources

The velocity of the instrument, in conjunction with the rotation of the earth, causes an error in the vertical as determined by a liquid pendulum or a falling body. This error is produced by the "acceleration of Coriolis," the technical name signifying relative motions of rotation between two coordinate systems.

The ball-dropping chamber fixes the coordinate system from which the measurements are to be made, but this system is moving relative to a coordinate system at rest in an approximate Newtonian or inertial system considered as fixed, relative to the system of the stars, at the axis of the earth.

The released ball is a free body moving with no discernible error in a two-body isolated Newtonian system containing only the ball and the earth. The motion of the ball-dropping chamber has essentially the property of freeing the ball from transverse resistance to its inertial motion in space. The ball, therefore, has an orbit in space in a plane passing through the center of gravity of the earth. The locus of the line from the ball to the earth's center does not cut the earth's surface along a great circle, as might be expected, because the earth has an independent rotation about its axis. The centrifugal force acting on the ball is also different from the centrifugal force at the corresponding point on the earth's surface. For this reason the line of fall will be deflected from the direction of motion of the sextant according to the following rules:

1. For motion along a meridian of longitude the deflection is:
    (a) East if moving toward the equator
    (b) West if moving away from the equator
2. For motion along a parallel of latitude the deflection is:
    (a) Toward the equator if the motion is from east to west.
    (b) Away from the equator if the motion is west to east, or in the same direction as the earth's rotation.

The formula and calculated values for this deviation are published by Dr. John Q. Stewart in The Review of Scientific Instruments of October, 1940, page 310; and by Lt. Comdr. P. V. H. Weems, U. S. Navy (retired), and Captain T. L. Thurlow, U. S. Air Corps, in the United States Naval Institute Proceedings of October, 1940, page 1420.

The altitude reading is in error by the amounts given in the table by Dr. Stewart, but these corrections can best be made to the line of position according to the rules prepared by Lt. Comdr. Weems and Capt. Thurlow. If the track is directed at 90° to the line of position, no displacement occurs; whereas the maximum displacement occurs when the track is parallel to the line of position.

If the observer is traveling at a speed of 240 miles per hour, or 352 feet per second, relative to the surface of the earth, his geographical position changes by approximately 0′.56 in ten seconds of time. The apparent diurnal motion of the body observed is equivalent to a motion greater than this except at the poles. No appreciable error is introduced, however, unless the mean time of the series is recorded with an error which is greater than is likely to occur.

Accelerations which, in practice, are indeterminate, may cause an incorrect reading of altitude; but a scattered pattern of the several ball impacts will indicate when a reading is unreliable. With the present averaging sextant the record that a reading has been affected, and is therefore incorrect, provides valuable data that cannot be obtained from the ordinary marine or liquid pendulum sextants.

The use in the present averaging sextant of the line of fall of a steel ball as a reference line, instead of the line of sight to an horizon, eliminates some errors to which the ordinary marine sextant is prone, namely, errors caused by the variability of the apparent horizon due to atmospheric refraction or due to indistinctness of the horizon resulting from haze, fog, or clouds. The refracting properties of the atmosphere vary with changing temperature and pressure. While it is seldom that the atmosphere will cause a radical error, it may occasionally cause the horizon to shift by as much as 5′ of arc. Tables have been computed to furnish a correction for atmospheric refraction, but these tables require knowledge of the values of temperature and pressure at all positions along the line of sight to the horizon. These are generally not available. The artificial pressure gradients of the atmosphere, such as those caused by the cowl of the aeroplane may produce appreciable refractive errors.

The direct sighting tube employed in the present averaging sextant has another advantage. Since the observer sights directly upon the body in question, rather than through a system of mirrors or prisms, there is obviated any possibility of confusing the identify of stars.

Having described the invention, what I claim as new is:

1. A missile-dropping device comprising a casing, a ratchet disc rotatably mounted upon said casing, said disc provided with a missile-receiving reservoir, the casing having a missile-discharge opening formed therein, said ratchet disc having a socket formed in the under face thereof, ratchet teeth formed in the periphery of said socket, oppositely opposed shuttles movable toward and away from said discharge opening, the shuttles having missile-supporting portions at their inner ends, said ratchet teeth being adapted to engage said shuttles to move said shuttles in one direction, means for moving the shuttles in a reverse direction whereby a missile will be alternately supported and released between said shuttles, and means for periodically feeding missiles to a supporting position between the shuttles.

2. A device of the class described comprising a casing, a ratchet disc rotatably mounted upon said casing, said ratchet disc having a missile reservoir, said casing having a missile-discharge opening, a missile-supporting means, means for periodically feeding missiles to the supporting means, a trigger for rotating said ratchet disc, means carried by the ratchet disc for actuating the missile-supporting means to alternately support and release missiles delivered to said supporting means, said casing having a refilling means communicating with said disc, said casing having a cut-out portion adjacent the periphery of said disc to facilitate access to the disc for normally rotating the disc while refilling.

3. A missile-dropping means of the class described comprising a support, a plurality of retractible horizontally slidable missile-suspending means carried by the support for holding the missile in a suspending position, a spring having opposite ends engaging the opposed suspending means and adapted to flex and instantaneously move the suspending means to a releasing position and out of contact with the missile, and an actuating means for setting said spring in motion to release the missile in a manner whereby the missile will fall by force of gravity in line with the true zenith point with no degree of deflection.

4. A missile-dropping means of the class described comprising a support, a plurality of retractible horizontally slidable missile-suspending means carried by the support for holding the missile in a suspending position, a spring having opposite ends engaging the opposed suspending means and adapted to flex and instantaneously move the suspending means to a releasing position and out of contact with the missile, and an actuating trigger for setting said spring in motion to release the missile in a manner whereby the missile will fall by force of gravity in line with the true zenith point with no degree of deflection.

5. A missile-dropping means of the class described comprising a support, a plurality of retractible horizontally slidable missile-suspending means carried by the support for holding the missile in a suspending position, a spring having opposite free ends engaging the opposed suspending means and adapted to flex and instantaneously move the suspending means to a releasing position and out of contact with the missile, and an actuating trigger for setting said spring in motion to release the missile in a manner whereby the missile will fall by force of gravity in line with the true zenith point with no degree of deflection.

6. A missile-dropping means of the class described comprising a support, opposed retractible horizontal sliding missile-suspending shuttles carried by said support for holding missiles in a suspended position, means for feeding the missiles one at a time to said shuttles, each shuttle having a missile-contacting inner end the upper face of which tapers toward the missile-contacting end, each shuttle being notched at the missile-contacting end and defining minute missile-contacting points to contact a missile below its equator and provide a minimum missile-contacting area.

FREDERICK H. HAGNER.